United States Patent
Böwing et al.

(10) Patent No.: US 9,476,381 B2
(45) Date of Patent: Oct. 25, 2016

(54) PISTON OF AN INTERNAL COMBUSTION ENGINE

(71) Applicant: Caterpillar Energy Solutions GmbH, Mannheim (DE)

(72) Inventors: Robert Böwing, Innsbruck (AT); Enrico Drehobl, Reilingen (DE); Christian Drexel, Lambsheim (DE); Manfred Rapp, Ubstadt-Weiher (DE)

(73) Assignee: Caterpillar Energy Solutions GmbH, Mannheim (DE)

( * ) Notice: Subject to any disclaimer, the term of this patent is extended or adjusted under 35 U.S.C. 154(b) by 72 days.

(21) Appl. No.: 14/391,330

(22) PCT Filed: Apr. 12, 2013

(86) PCT No.: PCT/EP2013/001087
§ 371 (c)(1),
(2) Date: Oct. 8, 2014

(87) PCT Pub. No.: WO2013/152870
PCT Pub. Date: Oct. 17, 2013

(65) Prior Publication Data
US 2015/0107543 A1    Apr. 23, 2015

(30) Foreign Application Priority Data
Apr. 13, 2012  (DE) ............ 10 2012 103 206

(51) Int. Cl.
*F02F 3/26*    (2006.01)
*F02F 3/28*    (2006.01)
(Continued)

(52) U.S. Cl.
CPC ............ *F02F 3/28* (2013.01); *F02B 23/0621* (2013.01); *F02B 23/0624* (2013.01); *F02B 23/0627* (2013.01); *F02B 23/08* (2013.01); *Y02T 10/125* (2013.01)

(58) Field of Classification Search
CPC  F02B 23/0627; F02B 23/0624; F02B 23/08; F02F 3/28; Y02T 10/125
USPC ................ 123/193.6, 262, 276, 657, 661
See application file for complete search history.

(56) References Cited

U.S. PATENT DOCUMENTS 2,172,170 A    9/1939  Megroot
3,469,564 A    9/1969  Hiereth
(Continued)

FOREIGN PATENT DOCUMENTS

CH    183532 A       4/1936
DE    2711681 A1     5/1978
(Continued)

OTHER PUBLICATIONS

International Search Report mailed Jun. 9, 2013, in Application No. PCT/EP2013/001087 by European Patent Office (3 pp).
(Continued)

*Primary Examiner* — Marguerite McMahon
(74) *Attorney, Agent, or Firm* — Finnegan, Henderson, Farabow, Garrett & Dunner, LLP

(57) ABSTRACT

A piston for an internal combustion engine is disclosed. The piston may have a piston skirt with a center axis. The piston may also have a piston crown disposed adjacent a top of the piston skirt. The piston crown may have a diameter D. The piston crown may have a piston crown margin of width b extending in a circumferential direction. The piston crown may also have a piston trough with a depth t. The piston trough may have a piston trough wall with a base diameter. The piston trough may also have at least one recess with a height h. The height h parallel to the direction of the center axis may satisfy the following requirement: $0.2\,t \leq h \leq t$.

20 Claims, 1 Drawing Sheet

(51) Int. Cl.
*F02B 23/06* (2006.01)
*F02B 23/08* (2006.01)

(56) References Cited

U.S. PATENT DOCUMENTS

| | | | |
|---|---|---|---|
| 3,508,531 | A | 4/1970 | Squinto et al. |
| 4,083,330 | A | 4/1978 | Morris |
| 4,114,518 | A | 9/1978 | Glover, Jr. et al. |
| 4,166,436 | A * | 9/1979 | Yamakawa .................. 123/262 |
| 4,281,629 | A | 8/1981 | List |
| 4,291,655 | A | 9/1981 | Yamakawa |
| 4,440,125 | A | 4/1984 | Case |
| 4,522,172 | A | 6/1985 | Oshima et al. |
| 4,635,597 | A | 1/1987 | Ohashi et al. |
| 4,721,080 | A | 1/1988 | Moriyasu et al. |
| 4,745,891 | A | 5/1988 | Cola |
| 4,771,748 | A | 9/1988 | Chmela et al. |
| 5,065,715 | A * | 11/1991 | Evans ........................ 123/263 |
| 5,103,784 | A | 4/1992 | Evans |
| 5,285,755 | A | 2/1994 | Regueiro |
| 5,329,902 | A | 7/1994 | Sakamoto et al. |
| 5,617,823 | A | 4/1997 | Gray, Jr. et al. |
| 6,213,086 | B1 | 4/2001 | Chmela et al. |
| 6,708,666 | B2 | 3/2004 | Roberts, Jr. |
| 6,745,745 | B2 | 6/2004 | Huebler et al. |
| 6,971,365 | B1 | 12/2005 | Najt et al. |
| 7,055,491 | B2 | 6/2006 | Linderyd et al. |
| 7,185,614 | B2 | 3/2007 | Meffert et al. |
| 7,210,448 | B2 | 5/2007 | Stanton et al. |
| 7,472,678 | B2 | 1/2009 | Tsujimoto et al. |
| 8,459,229 | B2 * | 6/2013 | Rothbauer et al. ........... 123/276 |
| 2004/0060537 | A1 | 4/2004 | Liu et al. |
| 2007/0261663 | A1 | 11/2007 | Lineton et al. |
| 2008/0276900 | A1 | 11/2008 | Umierski et al. |
| 2010/0108044 | A1 | 5/2010 | Liu |
| 2011/0253095 | A1 * | 10/2011 | Rothbauer et al. ........... 123/276 |
| 2013/0220266 | A1 | 8/2013 | Bandyopadhyay et al. |

FOREIGN PATENT DOCUMENTS

| | | |
|---|---|---|
| DE | 2945490 A1 | 5/1980 |
| DE | 3590066 C2 | 4/1986 |
| DE | 29515308 U1 | 1/1996 |
| DE | 19927479 A1 | 12/1999 |
| DE | 10261185 A1 | 7/2004 |
| DE | 10 2005 037562 A1 | 5/2006 |
| DE | 10 2009 025063 A1 | 12/2010 |
| DE | 10 2010 027 637 | 1/2012 |
| DE | 2010 027 637 | 1/2012 |
| EP | 0 969 191 A2 | 1/2000 |
| FR | 801 538 A | 8/1936 |
| FR | 2 451 458 A2 | 10/1980 |
| FR | 2 884 284 A1 | 10/2006 |
| FR | 2 927 121 A1 | 8/2009 |
| GB | 522 313 | 6/1940 |
| GB | 2 024 321 A | 1/1980 |
| GB | 2 074 231 A | 10/1981 |
| JP | S52-97009 A | 8/1977 |
| JP | 59-158317 | 9/1984 |
| JP | 62-075019 A | 4/1987 |
| JP | S62-113822 A | 5/1987 |
| JP | S63-001710 A | 1/1988 |
| JP | H07-026959 A | 1/1995 |
| JP | H09-228838 A | 2/1997 |
| JP | H09-096241 A | 4/1997 |
| JP | 11-093779 | 4/1999 |
| JP | 2001-227346 A | 8/2001 |
| JP | 2010-112347 A | 5/2010 |
| JP | 2012-021429 A | 2/2012 |
| WO | WO 85/00198 | 1/1985 |
| WO | WO 02/088528 A1 | 7/2002 |
| WO | WO 2010/142389 | 12/2010 |

OTHER PUBLICATIONS

U.S. Appl. No. 14/391,371, of Robert Böwing et al. filed Oct. 8, 2014.
U.S. Appl. No. 14/391,388, of Robert Böwing et al. filed Oct. 8, 2014.
U.S. Appl. No. 14/391,390, of Robert Böwing et al. filed Oct. 8, 2014.
International Search Report mailed Aug. 8, 2013, in Application No. PCT/EP2013/001075 by European Patent Office (2 pages).
International Search Report mailed Aug. 14, 2013, in Application No. PCT/EP2013/001076 by European Patent Office (3 pages).
International Search Report mailed Sep. 3, 2013, in Application No. PCT/EP2013/001088 by European Patent Office (3 pages).
Office Action issued in Austrian Patent Application No. A 9148/2013, mailed Feb. 17, 2015 (1 page).
Office Action from the Austrian Patent Office mailed Apr. 4, 2013, in Austrian Patent Application No. A 9146/2013 (1 page).

* cited by examiner

PISTON OF AN INTERNAL COMBUSTION ENGINE

CLAIM FOR PRIORITY

This application is a U.S. National Phase entry under 35 U.S.C. §371 from PCT International Application No. PCT/EP2013/001087, filed Apr. 12, 2013, which claims benefit of priority of German Patent Application No. 102012103206.8, filed Apr. 13, 2012, all of which are incorporated herein by reference.

TECHNICAL FIELD

The present disclosure generally relates to a piston of an internal combustion engine such as a spark-ignition engine with external mixture formation. In particular, the present disclosure relates to a piston comprising a piston skirt having a centre axis M and a piston crown limiting the piston skirt towards the top with a diameter D. The piston crown may be formed of a piston crown margin of the width b extending in circumferential direction U and a piston trough with a depth t. The piston trough may include a piston trough wall with a base diameter d. The piston trough according to its basic shape may be mostly cylindrical.

Furthermore, the present disclosure relates to an engine with such a piston.

BACKGROUND

From DE 1 029 613 A, different piston crown shapes for self-igniting engines are known, which are to make possible a low-noise combustion through optimal feed and intermixing of the injected fuel. In this respect a description is given of providing the piston trough wall with axially parallel or spiral-shaped separation edges so that the fuel is guided into the favorable swirl flow prevailing in the middle.

In spark-ignition gas engines, pistons with different piston trough shapes are employed. As a rule, the following usual variants are distinguished:

A) Piston with roof-shaped piston crown. The piston crown is configured for combustion processes with gas-scavenged pre-chamber so that the flare jets strike the combustion chamber walls as late as possible.
B) Piston with tub-shaped piston crown. The piston crown is configured so that a tumble flow generated on the inlet side is retained.
C) Piston with omega piston trough. The piston crown is configured for optimal direct injection for diesel operation and is also employed with the gas spark-ignition engine for cost reasons and for the sake of simplicity; the latter, however, despite a possibly poor combustion profile.
D) Piston with pot piston trough. The piston crown is configured so that between piston margin and cylinder head a squish flow in radial direction is created. Furthermore, the swirl flow in the pot piston trough is intensified.

For engines with swirl inlet ports and chamber plugs, pistons with pot piston troughs are highly suitable. During the compression stroke, the mixture above the piston crown margin (squish margin) of the piston is displaced into the pot piston trough. During the expansion stroke, the mixture is again sucked out of the pot piston trough. This process, in particular in the vicinity of the top dead centre, may lead to intense squish flows.

Complementarily to the squish flow, the pot piston trough also may lead to an acceleration of the swirl flow generated on the inlet side. Because of the rotary impulse retention, the rotational velocity of the swirl flow increases when the mixture is displaced to the inside into the pot piston trough.

The present disclosure is directed, at least in part, to improving or overcoming one or more aspects of the prior systems.

SUMMARY OF THE DISCLOSURE

In one aspect the present disclosure is directed to a piston for an internal combustion engine. The piston may comprise a piston skirt with a centre axis M and a piston crown limiting the piston skirt towards the top with a diameter D. The piston crown may be formed of a piston crown margin extending in a circumferential direction U and a piston trough with a depth t. The piston trough may include a piston trough wall with a base diameter d and at least one recess with a height h provided within the piston trough wall. The height h with respect to the direction of the centre axis M may satisfy the following requirement: $0.2\ t<=h<=t$, particularly $0.3\ t<=h$ or $0.4\ t<=h$ and $h<=t$.

The present disclosure furthermore relates to a diesel engine or spark-ignition engine or spark-ignition gas engine with a piston of the type described above guided therein. The spark-ignition engine or the spark-ignition gas engine can be an engine with external or internal mixture formation.

Other features and aspects of this disclosure will be apparent from the following description and the accompanying drawings.

BRIEF DESCRIPTION OF THE DRAWINGS

Further advantages and details of the present disclosure are explained in the patent claims and in the description and shown in the figures, in which:

DETAILED DESCRIPTION

Figure 1:
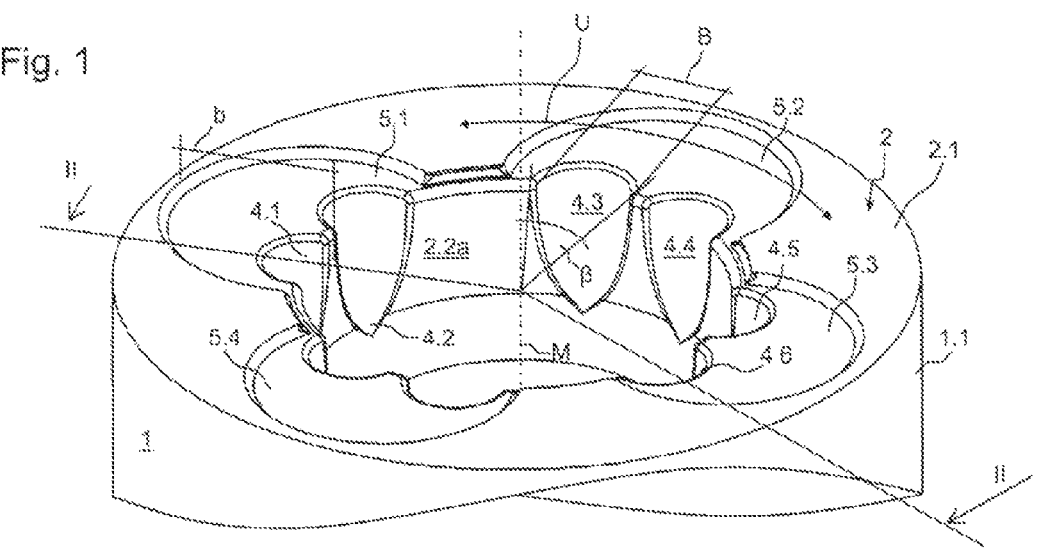
FIG. 1 shows a perspective view of a piston with recesses.

A piston 1 shown in FIG. 1 comprises a piston skirt 1.1 comprising a centre axis M and a piston crown 2 limiting the piston skirt 1.1 towards the top with a diameter D. The piston crown 2 is formed of a piston crown margin 2.1 of the width b and a piston trough 2.2 arranged centrally and coaxially to the centre axis M. The piston trough 2.2 has a substantially cylindrical piston trough wall 2.2a with a base diameter d and a piston trough base 2.2b.

Within the piston crown margin 2.1, four valve pockets 5.1-5.4 arranged distributed over the circumference U are provided. The valve pockets 5.1-5.4 serve for an adequate clearance of the inlet or exhaust valves during the operation of the shown piston 1.

In addition, a plurality of recesses 4.1-4.6 arranged distributed over the circumference U are provided within the piston trough wall 2.2a. The respective recess 4.1-4.6 in this case extends over a height h, which corresponds to approximately 75% of a depth t of the piston trough 2.2. Furthermore, the respective recess 4.1-4.6 has a maximum width B, which with respect to a circumferential direction U, produces an extent of the respective recess 4.1-4.6 by an angle β of approximately 40 degrees. The respective recess 4.1-4.6 comprises an axis of symmetry S, which includes an angle α of approximately 22 degrees with the centre axis M. Thus, with respect to the centre axis M, a radial extent r of the recess 4.1-4.6 is obtained, which varies with the height h of the recess 4.1-4.6. The radial extent r is maximal in the region of the piston crown margin 2.1 and tapers as far as 0 over the height h. A minimum dimension of radial extent r is necessary in order to be able to effectively induce turbulence. Because of the part-cylindrical shape of the recess 4.1-4.6 on the one hand and the setting at the angle α on the other hand, the radial extent r is greater than 0.5 mm over more than 95% of the height h.

Figure 2:
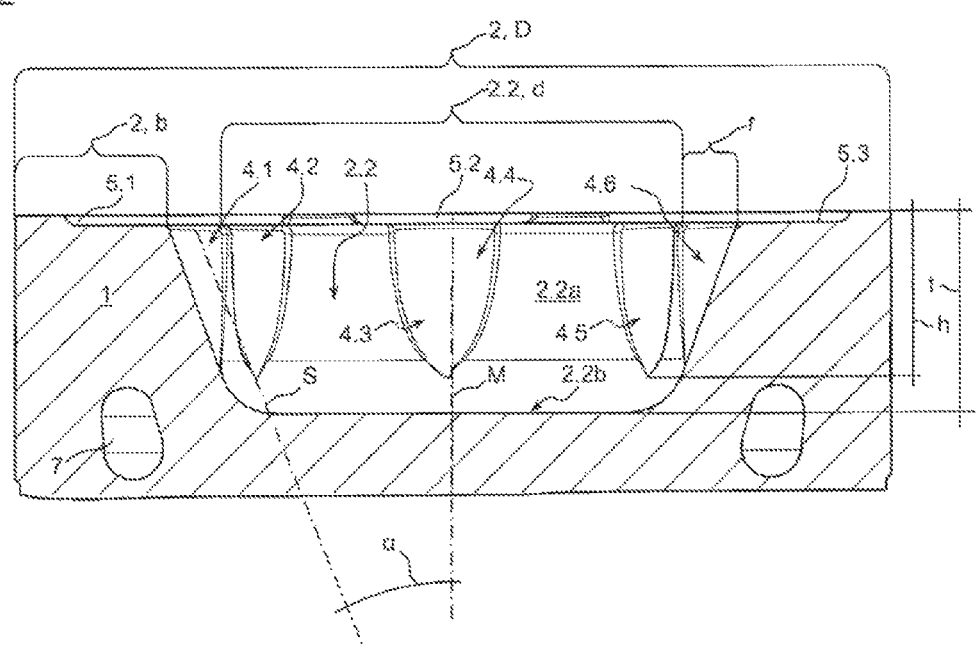
FIG. 2 shows a sectional representation of the piston according to FIG. 1.

FIG. 2 shows the sectional representation of the section II-II which, starting out from the recess 4.1, extends over the centre axis M towards the recess 4.6. Because of this, an overlap according to FIG. 2 occurs with respect to the representation of the recess 4.3, 4.4. Because of the setting of the axis of symmetry S at the angle α with respect to the centre axis M, an adequate wall thickness between the piston trough 2.2 and the cooling channel 7 is ensured.

According to the embodiment of FIG. 1, two recesses 4.1-4.6 for each valve pocket 5.1-5.4 are respectively provided in the region of the respective valve pocket 5.1-5.4. The squish flow into the piston trough 2.2 and out of the piston trough 2.2 created during the up and down movement of the piston 1 is somewhat disturbed anyhow in this region because of the valve pocket 5.1-5.4. By arranging the respective recesses 4.1-4.6, in particular in the region of the respective valve pocket 5.1-5.4, the squish flow which is already influenced anyhow, is influenced further. Compared with this, a formation of a complete squish flow between the piston crown margin 2.1 and the piston trough 2.2 remains, however, in the regions between the valve pockets 5.1-5.4.

Because of the recesses 4.1-4.6, the swirl flow created within the piston trough 2.2, in particular in the region of the piston trough wall 2.2a, is swirled, in particular in the region of the respective edge of the respective recesses 4.1-4.6, so that altogether an increased turbulence induction is achieved.

Figure 3:
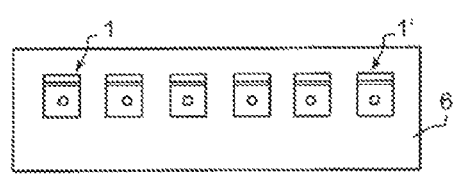
FIG. 3 shows a diagram sketch of an engine.

According to the embodiment of FIG. 3, a piston 1, 1' as described according to FIG. 1 and FIG. 2 can also be employed within an engine or engine block 6 of a spark-ignition engine with external mixture formation.

INDUSTRIAL APPLICABILITY

According to the present disclosure a piston is designed for an internal combustion engine in such a manner that an improved combustion may be achieved. The creation of the squish flow and the intensification of the swirl flow may have a positive effect on the combustion. However, it might be even more positive still if these directed flows could be specifically converted into turbulence, since this would even further improve the combustion.

According to an exemplary embodiment of the present disclosure, within the piston trough wall, starting out from the piston crown margin, at least one recess with a height h is provided, wherein the height h with respect to the direction of the centre axis M satisfies the following requirement: $0.2\ t<=h<=t$.

There may be considered to be a recess when the base diameter d of the piston trough wall or the piston trough wall comprises a cavity, which in radial direction towards the centre axis M is, for example, at least 2 mm deep. This means that with respect to the radial direction towards the centre axis M, the recess may form a depression within the piston trough wall. The recess preferentially starts at the upper edge of the piston trough wall, i.e. on the piston crown margin and extends downwards towards the piston trough base. Because of this, the width b of the piston crown margin may be correspondingly reduced in the region of the recess. Because of the recess, the swirl flow prevailing in the piston trough may be broken open at least in the region of the piston trough wall so that swirls are created in particular on the edges of the recess, which establish a turbulent flow component. The swirls may develop via the height h, so that with increased height h more turbulence can be created. The increased turbulence may lead to an accelerated combustion and to a faster and more complete combustion in the cylinder. Because of this, the efficiency and the knocking interval of the engine may be increased.

According to an exemplary embodiment of the present disclosure the diameter D of the piston crown may correspond to the piston diameter. The piston diameter likewise may correspond to the diameter d of the opening cross section of the piston trough plus twice the width b of the piston crown margin.

According to another exemplary embodiment of the present disclosure the ratio of the diameter d of the opening cross section or of the trough diameter to the diameter D of the piston crown or of the piston diameter preferentially satisfies the following requirement: $d/D=0.4-0.6$.

According to another exemplary embodiment of the present disclosure the ratio of the depth t of the piston trough to the diameter D of the piston crown or of the piston diameter preferentially satisfies the following requirement: $t/D=0.15-0.35$.

According to a further exemplary embodiment of the present disclosure it can also be advantageous when the recess with respect to the circumferential direction U extends on the maximum width B over an angle β, where $β<=180°$ or $3°<=β<=90°$ or $5°<=β<=45°$ or $10°<=β<=40°$. Because of the recess, the swirl flow prevailing in the piston trough may be broken open in the region of the piston trough wall, so that swirls develop in particular on the edges of the recess, which establish a turbulent flow component. The type and the intensity of the swirl may depend on the extent of the recess in circumferential direction, thus the angle β and the maximum width B of the recess in the region of the piston trough wall. If this becomes too small, the turbulence-inducing effect may be reduced. If it becomes too wide, only a highly limited number of depressions may be realized.

According to another exemplary embodiment of the present disclosure, furthermore, a plurality of recesses arranged distributed over the circumference U may be provided. As already explained above, the recess may have to have a certain size so that it causes the desired effect, i.e. an effective breaking-open of the swirl flow prevailing in the piston trough. A plurality of such recesses, which may be arranged distributed over the circumference U, may increase this effect.

According to another exemplary embodiment of the present disclosure the recess with respect to the centre axis M may have a radial extent r beyond the base diameter d of the piston trough, wherein the radial extent r over at least 50% of the height h is at least 0.5 mm to 2 mm in size. The degree of the turbulence that can be induced may be in part dependent on the dimension of the radial extent. A minimum dimension of radial extent r may be necessary in order to be able to effectively induce turbulence. This minimum dimension may be present when the radial extent r is provided over at least 50% of the height h of the recess and satisfies the following requirement: $0.02<=r/D<=0.1$. The radial extent r however may have to be at least 2 mm in size or depth in order to establish a lasting effect on the turbulence induction.

According to another exemplary embodiment of the present disclosure the recess may comprise an axis of symmetry S, wherein the axis of symmetry S with respect to the centre axis M is set at an angle α, where 0°<=α<=30° or 5°<=α<=25°. By setting the axis of symmetry S towards the centre axis M, a tapering of the recess towards the bottom may be achieved. By tapering the recesses towards the piston trough base, the strength of the piston in this region is influenced only to a minor degree. The axis of symmetry S in this case can also relate to only a substantial part of the recess. If the axis of symmetry S changes continuously, as for example with a parabolic recess, an average or averaged axis of symmetry S should be aimed at.

According to a further exemplary embodiment of the present disclosure in the piston crown margin at least one valve pocket may be introduced and the recesses may be exclusively or at least partially provided in the region of at least one valve pocket. Under certain conditions, the piston, which is provided with the recesses, may comprise valve pockets which by themselves form a recess with a low height h within the piston trough wall. If the recess with respect to the circumferential direction U is provided at the height of the valve pockets, the squish flow in the regions between the valve pockets remains may be uninfluenced. Merely where valve pockets are provided anyhow, i.e. where the squish flow is already influenced, will there be a further decrease of the squish flow in favor of the generatable turbulence because of the recess.

In connection with the formation and arrangement according to the present disclosure it might be advantageous if for each valve pocket one, two, three, four or more recesses are provided. The number of the recesses, on the one hand, may dependent on the ratio of their size to the size of the respective valve pocket. The number may also determined according to the effect on the swirl flow that can be achieved thereby in each case.

According to another exemplary embodiment of the present disclosure the recesses may be arranged symmetrically distributed over the circumference U. Here, the distribution can be symmetrical or else, according to the respectively prevailing flow conditions, asymmetrical. An irregular distribution of the valve pockets over the circumference is also conceivable in principle. It can be advantageous to create turbulence only in the region of a circumferential zone, while in another circumferential zone adequate turbulence is provided through the prevailing flow conditions. In this zone, the squish flow is then not influenced by turbulence pockets.

The invention claimed is:

1. A piston for an internal combustion engine, comprising:
a piston skirt with a centre axis; and
a piston crown disposed adjacent a top of the piston skirt, the piston crown having a diameter D, wherein the piston crown includes:
 a piston crown margin extending in a circumferential direction and including at least one valve pocket;
 at least one recess provided in the at least one valve pocket; and
 a piston trough with a depth t,
wherein the piston trough includes a piston trough wall with a base diameter and the least one recess with a height h within the piston trough wall, wherein the height h parallel to the direction of the centre axis satisfies the following requirement:
 0.2 t<=h<=t.

2. The piston according to claim 1, wherein the at least one recess extends in the circumferential direction over an angle β, where
β<=180°.

3. The piston according to claim 1, wherein the recess extends radially for a radial extent r beyond the base diameter of the piston trough, wherein the radial extent r, over at least 50% of the height h, satisfies the following requirement:
0.02<=r/D<=0.1.

4. The piston according to claim 1, wherein a plurality of recesses are distributed along the circumferential direction.

5. The piston according to claim 1, wherein the at least one recess comprises an axis of symmetry, and the axis of symmetry is set at an angle α with respect to the centre axis, where 0°<=α<=30°.

6. The piston according to claim 1, wherein the at least one valve pocket includes a bottom surface and the at least one recess extends from the bottom surface towards a base of the piston trough.

7. The piston according to claim 4, wherein one or more recesses are provided in the at least one valve pocket.

8. The piston according to claim 4, wherein the recesses are arranged symmetrically in the circumferential direction.

9. The piston according to claim 1, wherein the recess extends in the circumferential direction over an angle β, where
3°<=β<=90°.

10. The piston according to claim 1, wherein the at least one recess comprises an axis of symmetry, and the axis of symmetry is set at an angle α with respect to the centre axis, where
5°<=α<=25°.

11. An engine, comprising:
an engine block; and
a piston, including:
 a piston skirt with a centre axis; and
 a piston crown disposed at a top of the piston skirt, the piston crown having a diameter D,
 wherein the piston crown includes:
  a piston crown margin extending in a circumferential direction and including at least one valve pocket;
  at least one recess provided in the at least one valve pocket; and
  a piston trough with a depth t,
 wherein the piston trough includes a piston trough wall with a base diameter and the least one recess with a height h within the piston trough wall, wherein the height h parallel to the direction of the centre axis satisfies the following requirement:
  0.2 t<=h<=t.

12. The engine according to claim 11, wherein the at least one recess extends in the circumferential direction over an angle β, where
β<=180°.

13. The engine according to claim 11, wherein the recess extends radially for a radial extent r beyond the base diameter of the piston trough, wherein the radial extent r, over at least 50% of the height h, satisfies the following requirement:
0.02<=r/D<=0.1.

14. The engine according to claim 11, wherein a plurality of recesses are distributed along the circumferential direction.

15. The engine according to claim 11, wherein the at least one recess comprises an axis of symmetry, and the axis of symmetry is set at an angle α with respect to the centre axis, where 0°<=α<=30°.

16. The engine according to claim 11, wherein the at least one valve pocket includes a bottom surface and the at least one recess extends from the bottom surface towards a base of the piston trough.

17. The engine according to claim 11, wherein one or more recesses are provided in the at least one valve pocket.

18. The engine according to claim 14, wherein the recesses are arranged symmetrically in the circumferential direction.

19. The engine according to claim 11, wherein the recess extends in the circumferential direction over an angle $\beta$, where $3° \leq \beta \leq 90°$.

20. The engine according to claim 11, wherein the at least one recess comprises an axis of symmetry, and the axis of symmetry is set at an angle $\alpha$ with respect to the centre axis, where $5° \leq \alpha \leq 25°$.

\* \* \* \* \*